(12) United States Patent
Funabashi

(10) Patent No.: US 8,874,347 B2
(45) Date of Patent: Oct. 28, 2014

(54) SURROUNDING VEHICLE RECOGNITION DEVICE

(71) Applicant: Denso Corporation, Kariya (JP)

(72) Inventor: Junichiro Funabashi, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/945,965

(22) Filed: Jul. 19, 2013

(65) Prior Publication Data

US 2014/0107890 A1 Apr. 17, 2014

(30) Foreign Application Priority Data

Oct. 11, 2012 (JP) .................................. 2012-226187

(51) Int. Cl.
*G06F 17/00* (2006.01)
*G08G 1/16* (2006.01)
*G08G 1/00* (2006.01)
*G05D 1/02* (2006.01)

(52) U.S. Cl.
CPC ............... *G06F 17/00* (2013.01); *G08G 1/161* (2013.01); *B60W 2750/306* (2013.01); *B60W 2550/30* (2013.01); *G05D 1/0293* (2013.01); *B60W 2750/308* (2013.01); *G08G 1/22* (2013.01)
USPC .............................................. 701/96; 701/36

(58) Field of Classification Search
CPC .......... G06F 17/00; G08G 1/22; G08G 1/161; G08G 1/00; B60W 2750/306; B60W 2750/308; B60W 2050/008; B60W 2050/30; B60W 30/16; B60W 2550/408; G05D 1/0293; G05D 1/0287; G05D 1/0295

USPC ....................................................... 701/96, 36
See application file for complete search history.

(56) References Cited

U.S. PATENT DOCUMENTS

| 5,680,122 A | 10/1997 | Mio |
| 6,249,232 B1 * | 6/2001 | Tamura et al. ................ 340/902 |
| 6,356,820 B1 | 3/2002 | Hashimoto et al. |
| 8,483,903 B2 * | 7/2013 | Tengler et al. ................ 340/435 |

FOREIGN PATENT DOCUMENTS

| JP | 3358403 B2 | 3/1997 |
| JP | 2001-006099 A | 1/2001 |
| JP | 2002-222491 A | 8/2002 |
| JP | 2011-250021 A | 12/2011 |

OTHER PUBLICATIONS

Office Action issued Sep. 9, 2014 in corresponding JP Application No. 2012-226187.

\* cited by examiner

*Primary Examiner* — Marthe Marc-Coleman

(57) ABSTRACT

A behavior acquisition unit acquires behavior related information about a leading vehicle, which travels at a position closest to the self vehicle on an advancing route of the self vehicle. A front vehicle recognition determination unit determines, as a front vehicle recognition state, whether a leading vehicle is specified and whether a self vehicle travels immediately after the leading vehicle, according to the acquired behavior related information. A sending control unit is configured to cause transmission of the front vehicle recognition state and specifying information, which specifies the self vehicle and the leading vehicle, to surroundings of the self vehicle.

8 Claims, 5 Drawing Sheets

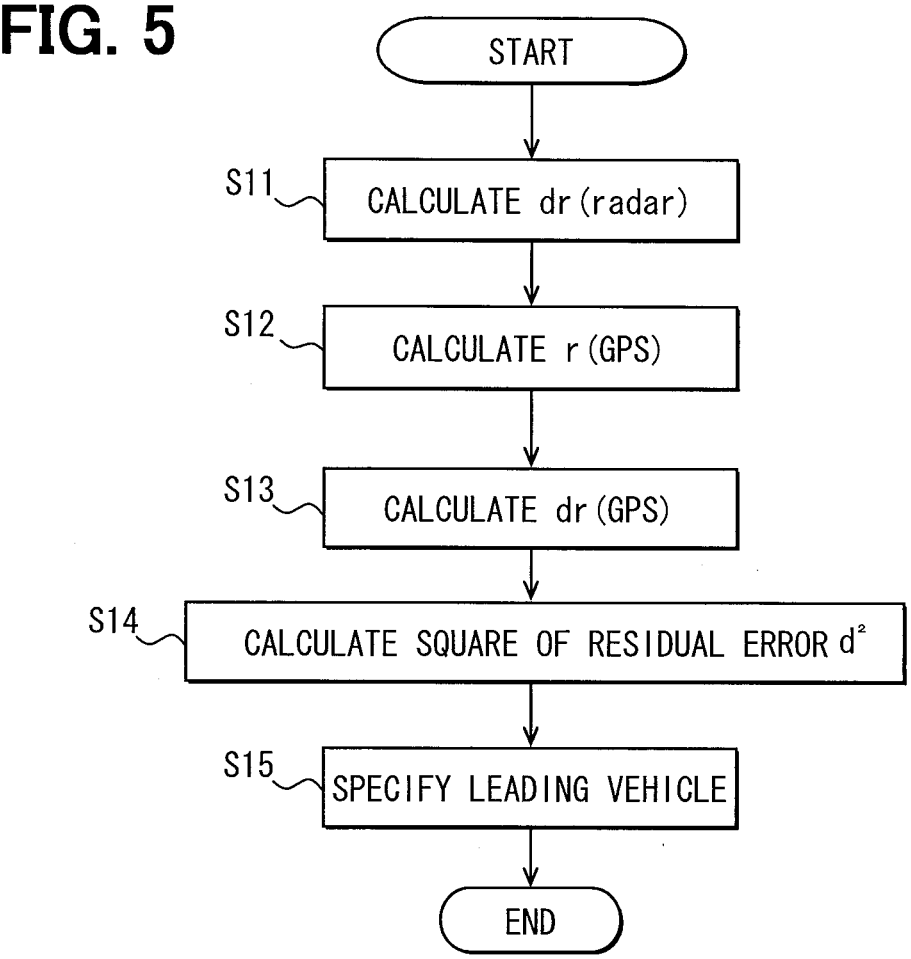

SURROUNDING VEHICLE RECOGNITION DEVICE

CROSS REFERENCE TO RELATED APPLICATION

This application is based on reference Japanese Patent Application No. 2012-226187 filed on Oct. 11, 2012, the disclosure of which is incorporated herein by reference.

TECHNICAL FIELD

The present disclosure relates to a surrounding vehicle recognition device configured to determine a recognition state of a self vehicle about a surrounding vehicle for enabling the self vehicle to implement a travel control based on a relation relative to the surrounding vehicle.

BACKGROUND

In general, a vehicle implements various traveling controls. In many cases, such traveling controls of a vehicle are implemented based on a relation relative to a surrounding vehicle. For example, when a vehicle implements a rank-traveling control, the vehicle implements a speed control of the self vehicle according to speed control information about another vehicle in a rank, to which the self vehicle belongs.

When the self vehicle starts rank traveling relative to a vehicle (leading vehicle), which travels directly ahead of the self vehicle, it is necessary to specify the leading vehicle among vehicles, which travel ahead the self vehicle. A patent document 1 discloses a known art for specifying a leading vehicle. The patent document 1 discloses a configuration to detect the distance relative to a front vehicle according to GPS position information and to detect the distance relative to a front object according to a detection value of a radar detection device. The configuration of the patent document 1 further specifies a vehicle, at which the distance according to GPS position information coincides with the distance according to the detection value of the radar detection device, as a leading vehicle.

[Patent document 1] JP-A-2002-222491

In general, a number of vehicles simultaneously travel on a road. In consideration of this, it may be desirable to acquire, in addition to the behavior of a leading vehicle, the behavior of a vehicle ahead of the leading vehicle. More specifically, for example, it is assumable that a vehicle, which travels in front of several vehicles ahead of a leading vehicle, may decelerates. In such a case, when deceleration of the vehicle further ahead of the leading vehicle is recognizable, quick traveling control is enabled before the leading vehicle decelerates.

In a configuration equipped with an inter-vehicle communication device, behavior information may be receivable from a vehicle, which is in front of several vehicles ahead of the self vehicle and is within a communication range. Nevertheless, it is noted that, when a certain vehicle decelerates, deceleration timing and degree of deceleration vary among vehicles behind the certain vehicle. In consideration of this, in order to enable an advanced traveling control, it may be desirable, when behavior information is acquired from a certain vehicle, to determine the number of vehicles, which are traveling ahead of the self vehicle and traveling between the self vehicle and the certain vehicle.

Nevertheless, an inter-vehicle communication device is not necessarily equipped to every vehicle. Therefore, even when some of vehicles notify those current positions to surroundings via inter-vehicle communications, other vehicles, which are not equipped with an inter-vehicle communication device, may not notify those current positions to surroundings. Thus, in such a circumstance, a vehicle may receive notification from a part of surrounding vehicles, which are equipped with an inter-vehicle communication device, and cannot receive notification from other surrounding vehicles, which are not equipped with an inter-vehicle communication device. Consequently, the vehicle may not be able to recognize the other surrounding vehicles among all the surrounding vehicles, even receiving the notification from a part of surrounding vehicles. For example, it is assumed that vehicles 1, 2, 3 other than the self vehicle exist. In such a case, from the position of each vehicle acquired via inter-vehicle communications, it may be determined that the vehicle 1 travels directly behind the vehicle 2. Nevertheless, in such a case, the vehicle 3, which is not equipped with an inter-vehicle communication device, may exist between the vehicle 1 and the vehicle 2.

In addition, the configuration of the patent documents 1 may enable to recognize that a vehicle does not exist between the self vehicle and a leading vehicle, nevertheless, is incapable to recognize a state ahead of the leading vehicle.

In consideration of these subjects, even in a configuration to acquire a traveling state of a vehicle other than a leading vehicle via inter-vehicle communications and to implement traveling control of the self vehicle according to the acquired traveling state, a vehicle, which is not equipped with an inter-vehicle communication device, may still possibly exists. To implement the traveling control of the self vehicle, such existence of a vehicle, which is not equipped with an inter-vehicle communication device, need to be taken into account. Therefore, such a conventional configuration is hard to enable an advanced traveling control.

SUMMARY

It is an object of the present disclosure to produce a surrounding vehicle recognition device configured to enable a traveling control according to a traveling state of a front vehicle.

According to an aspect of the present disclosure, a surrounding vehicle recognition device, which is equipped to a vehicle and configured to implement sequential determination of a front vehicle recognition state, which is a recognition state of a self vehicle about a front vehicle traveling ahead the self vehicle. The surrounding vehicle recognition device comprises an inter-vehicle communication device. The surrounding vehicle recognition device further comprises a surrounding vehicle information acquisition unit configured to acquire, via the inter-vehicle communication device, vehicle state notification information, which is sent from a surrounding vehicle existing around the vehicle. The vehicle state notification information includes behavior related information, which is at least one of a position of a surrounding vehicle and speed related information. The surrounding vehicle recognition device further comprises a behavior acquisition unit configured to acquire the behavior related information about a leading vehicle, which travels at a position closest to the self vehicle on an advancing route of the self vehicle. The surrounding vehicle recognition device further comprises a front vehicle recognition determination unit configured to determine, as the front vehicle recognition state, one of three states. The one of three states includes a standby state, in which the vehicle state notification information is not received from a front vehicle. The one of three states further includes a detecting state, in which the vehicle state notification information is received from at least one front vehicle, and a leading vehicle cannot be specified. The one of three states further includes a tracing state, in which a leading vehicle is specified, and the self vehicle travels immediately after the leading vehicle. The front vehicle recognition state is determined according to the behavior related information included in the vehicle state notification information, which is acquired by the surrounding vehicle information acquisition unit, and the behavior related information, which is acquired by the behavior acquisition unit. The surrounding vehicle recognition device further comprises a sending control unit. The sending control unit is configured to incorporate the front vehicle recognition state, which is determined by the front vehicle recognition determination unit, self vehicle specifying information, which specifies the self vehicle, and the behavior related information about the self vehicle, into the vehicle state notification information. The sending control unit is further configured to incorporate leading vehicle specifying information, which specifies a leading vehicle, into the vehicle state notification information, when the tracing state is determined as the front vehicle recognition state. The sending control unit is further configured to cause the inter-vehicle communication device to send the vehicle state notification information to surroundings of the self vehicle.

BRIEF DESCRIPTION OF THE DRAWINGS

The above and other objects, features and advantages of the present invention will become more apparent from the following detailed description made with reference to the accompanying drawings. In the drawings:

FIG. 5 is a flow chart showing a leading vehicle specifying processing; and

DETAILED DESCRIPTION

Embodiment

Figure 1:
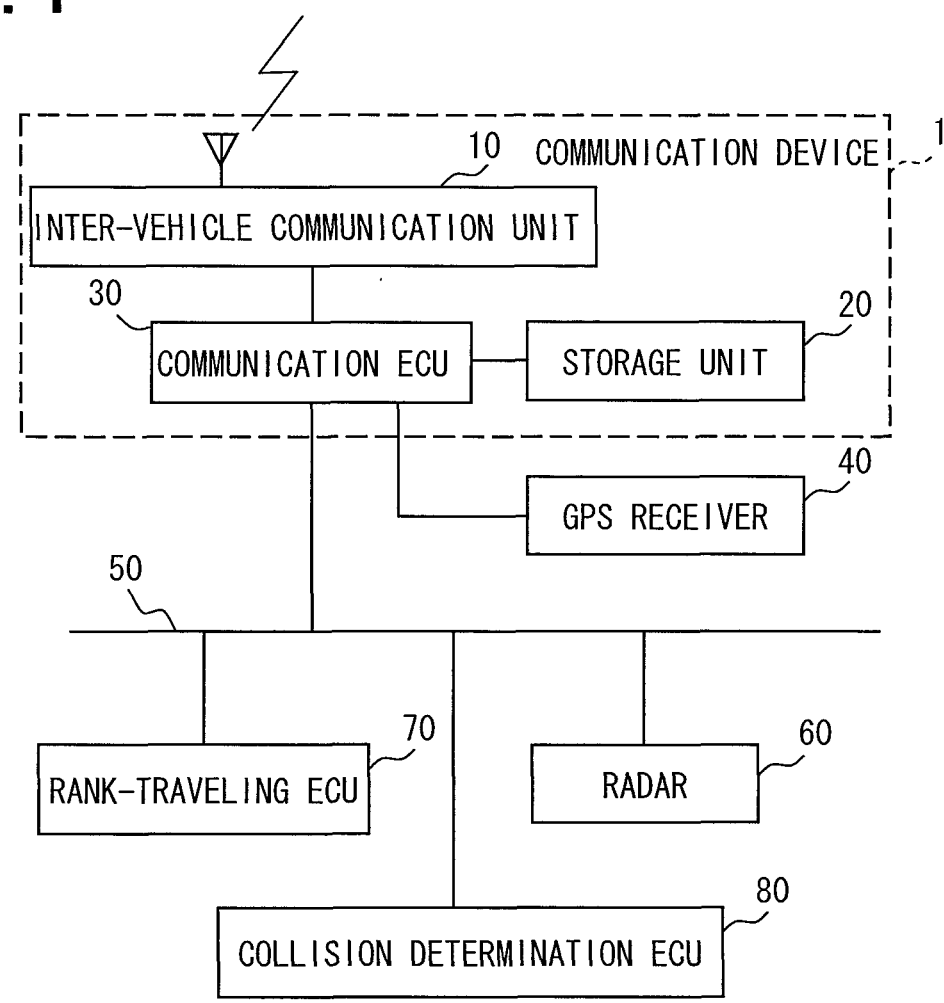
FIG. 1 is a block diagram showing a vehicular communication device and showing vehicular devices configured to exchange a signal with the vehicular communication device, according to an embodiment of the present disclosure.

As follows, an embodiment of the present disclosure will be described with reference to drawings. As shown in FIG. 1, a vehicular communication device 1 functions as a surrounding vehicle recognition device. The vehicular communication device 1 includes an inter-vehicle communication unit 10, a storage unit 20, and a communication ECU 30. The communication ECU 30 is connected with a GPS receiver 40. It is noted that, the GPS receiver 40 may be equipped as an internal component in the vehicular communication device 1. The communication ECU 30 is further communicable with other vehicular devices, such as a radar device 60 and a rank-traveling ECU 70, via a CAN 50.

The inter-vehicle communication unit 10 is a generally known inter-vehicle communication device and is configured to implement short-range wireless communications in a frequency band, such as 700-MHz band and 5.8-GHz band. In the present embodiment, the inter-vehicle communications are implemented in a broadcast method, without specifying a counterpart vehicle. The short-range wireless communications are implemented substantially omnidirectionally in a communication range, such as, hundreds of meters in radius. The inter-vehicle communication unit 10 sends vehicle state notification information about the self vehicle to the surroundings. In addition, the inter-vehicle communication unit 10 receives vehicle state notification information sent from a vehicular communication device 1 each equipped in a vehicle around the self vehicle.

The storage unit 20 is configured to store vehicle state notification information, a distance r (radar) from a leading vehicle, which is ahead of the self vehicle, the coordinates of the self vehicle, and the like. The vehicle state notification information is received from surrounding vehicles with the inter-vehicle communication unit 10. The distance r from a leading vehicle is detected with the radar device 60. The coordinates of the self vehicle is determined with the GPS receiver 40. The communication ECU 30 is a computer device equipped with a CPU, a ROM, a RAM, and the like (none shown). More specifically, in the communication ECU 30, the CPU executes a program stored in the ROM by utilizing temporarily stored data in the RAM, thereby to control the inter-vehicle communication unit 10 and the storage unit 20. The communication ECU 30 further acquires a signal from the GPS receiver 40, the radar device 60, and the like and executes a processing for implementing sequential determination about a front vehicle recognition state and a rear vehicle recognition state. The processing will be described later in detail. The rank control ECU 70, the collision determination ECU 80, and the like are notified of the front vehicle recognition state and the rear vehicle recognition state, which are determined by the communication ECU 30.

The GPS receiver 40 receives a signal sent from a GPS satellite and implements sequential decision of the coordinates of the current position based on the received signal.

The radar device 60 radiates an electromagnetic wave frontward relative to the self vehicle in a narrow directivity angle range, while scanning its radiation direction, and detects reflection of the electromagnetic wave. The communication ECU 30 controls radiation of the electromagnetic wave. The communication ECU 30 further receives a signal, which represents detection of the reflection of the electromagnetic wave. The radar device 60 may be a millimeter wave radar device, a laser radar device, or the like. The radar device 60 enables calculation of the distance from and the direction to one or more objects ahead of the self vehicle.

When the self vehicle is traveling, an object, which is located on an advancing route ahead of the self vehicle and closest to the self vehicle, is deemed to be a leading vehicle. Therefore, the radar device 60 calculates the distance to the object, which is located on the advancing route ahead of the self vehicle and closest to the self vehicle, as a relative position of the leading vehicle to the self vehicle. The present distance is behavior related information about the leading vehicle. The curvature of an advancing route, on which the self vehicle travels, may be set correspondingly to a curvature determined according to a steering angle. Alternatively, when information about the steering angle is acquirable, the curvature of the advancing route may be set correspondingly to a curvature determined according to the acquired information. When a road curvature is acquirable, the road curvature may be set as the curvature of the advancing route of the self vehicle. In other cases, the road in the front direction of the self vehicle is deemed to be the advancing route. The width of the advancing route is deemed to be the width of the self-vehicle or the width of the lane.

The rank-traveling ECU 70 forms a rank, such that the distance between the self vehicle and a vehicle, which is located ahead or behind the self vehicle, is less than the distance in a normal operation in which the driver controls the distance. The rank-traveling ECU 70 further controls the speed of the self vehicle while forming the rank and while acquiring information about acceleration and deceleration of other vehicles in the rank via inter-vehicle communications. The distance between vehicles when the self vehicle travels in the rank changes according to its vehicle speed. For example, a distance, by which the self vehicle travels in 0.5 seconds at the present vehicle speed, may be deemed as the distance between vehicles.

The collision determination ECU 80 acquires the vehicle speed from a speed sensor (not shown) through a CAN 50. The collision determination ECU 80 further acquires a signal, which is for detecting the distance from a leading vehicle, from the radar device 60. The collision determination ECU 80 further calculates an arrival time period at a present position of the front vehicle, on assumption that the front vehicle stops at the present position. The arrival time period is determined based on the vehicle speed and the distance between the self vehicle and the front vehicle. When the arrival time period becomes less than a predetermined alarm reference time period, such as 0.6 sec, a speaker device (not shown) is activated to emit an alarm sound.

Figure 2:
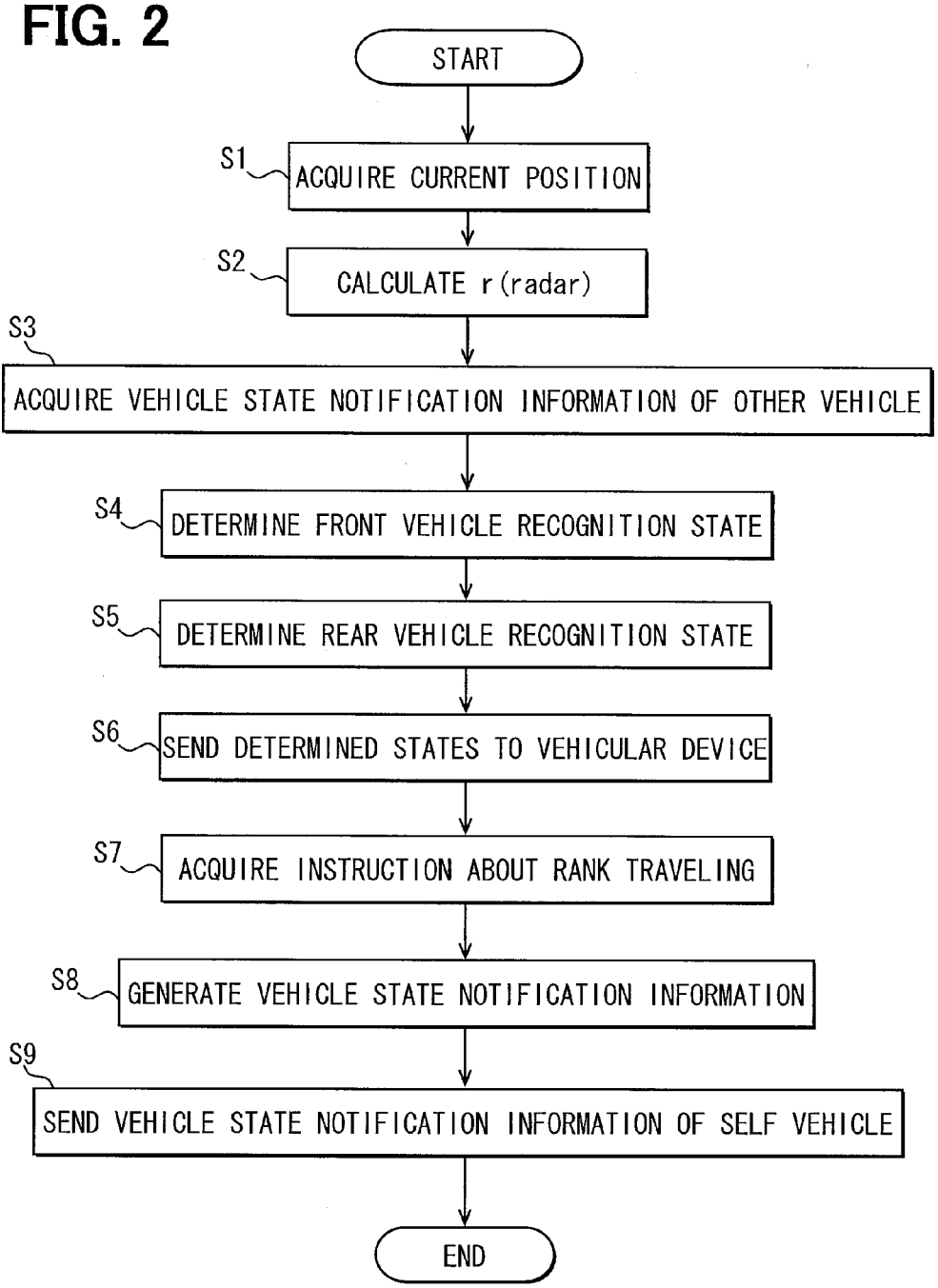
FIG. 2 is a flow chart showing a processing executed by a communication ECU to determine a front vehicle recognition state and a rear vehicle recognition state.

Subsequently, a processing executed by the communication ECU 30 to determine the front vehicle recognition state and the rear vehicle recognition state will be described with reference to FIG. 2. The communication ECU 30 executes the processing shown in this FIG. 2 at a predetermined interval, such as 100 msec, while the vehicle travels.

At step S1, the communication ECU 30 acquires a signal from the GPS receiver 40 and implements a positioning operation of the current position of the GPS receiver 40, which is represented by its latitude and its longitude, according to the signal. The communication ECU 30 stores the current position in the storage unit 20.

At step S2, the communication ECU 30 causes the radar device 60 to emit an electromagnetic wave and successively acquires, from the radar device 60, a signal representing a reflected wave of the emitted electromagnetic wave. The communication ECU 30 further calculates a time difference between a time point, at which the electromagnetic wave is emitted, and a time point, at which the reflected wave is detected. The communication ECU 30 further determines the distance r (radar) between the self vehicle and the leading vehicle based on the time difference. The communication ECU 30 stores the distance in the storage unit 20. The distance r (radar) between the self vehicle and the leading vehicle may be one example of behavior related information about a leading vehicle. Step S2 may be one example of a behavior acquisition unit.

Subsequent step S3 may be one example of a surrounding vehicle information acquisition unit. At step S3, the communication ECU 30 acquires vehicle state notification information from the inter-vehicle communication unit 10. The vehicle state notification information is sent from the vehicular communication device 1 equipped to a surrounding vehicle around the self vehicle. The vehicle state notification information includes a device ID of the vehicular communication device 1, from which the vehicle state notification information is sent, the current position (GPS information), which is detected by the vehicular communication device 1 by using the GPS receiver 40, and information of the vehicle equipped with the vehicular communication device 1. The information of the vehicle may include the speed of the vehicle, the azimuthal angle of the vehicle, the width of the vehicle, the length of the vehicle. The device ID may be one example of self vehicle specifying information. The vehicle state notification information further includes the front vehicle recognition state and the rear vehicle recognition state of the vehicle. In addition, when the front vehicle recognition state is in a tracing state, the vehicle state notification information includes a device ID (leading vehicle specifying information) of the vehicular communication device 1 equipped to the leading vehicle, which is traced by the self vehicle. When the rear vehicle recognition state is in a traced state, the vehicle state notification information includes a device ID (rear vehicle specifying information) of the vehicular communication device 1 equipped to the rear vehicle, which traces the self vehicle.

It is assumed cases where the vehicular communication device 1, which sends the vehicle state notification information, receives a coupling instruction to a leading vehicle or an uncoupling instruction from a leading vehicle from the rank-traveling ECU 70, which is equipped to the same vehicle equipped with the vehicular communication device 1. In such cases, the vehicle state notification information includes the coupling request signal (coupling request) to a leading vehicle or an uncoupling notification signal (uncoupling notification) from a leading vehicle, respectively. It is further assumed cases where the vehicular communication device 1 receives, from the rank-traveling ECU 70, a coupling instruction to a rear vehicle or an uncoupling instruction from a rear vehicle. In such cases, the vehicle state notification information includes a coupling permission signal (coupling permission) or a coupling refusal signal (coupling refusal), respectively.

Subsequent step S4 may be one example of a front vehicle recognition determination unit. At step S4, the communication ECU 30 determines, from the distance r (radar) between the vehicles calculated at step S2 and the vehicle state notification information acquired at step S3, the front vehicle recognition state in which the self vehicle recognizes a front vehicle ahead the self vehicle. The wording of the front vehicle incorporates a leading vehicle and has a wider concept than a leading vehicle. A leading vehicle may be a vehicle, which travels directly ahead of the self vehicle on the same lane as the lane on which the self vehicle travels. That is, no vehicle exists between the leading vehicle and the self vehicle. On the other hand, a front vehicle may be a vehicle, which travels ahead of the self vehicle relative to the travelling direction of the self vehicle and advances in the same direction as the self vehicle. The vehicle, which advances in the same direction as the self vehicle, may exclude a vehicle advancing in an opposite direction from the self vehicle and may exclude a vehicle advancing in a transverse direction relative to the self vehicle. Determination whether a vehicle is a front vehicle is made based on the vehicle state notification information sent from a surrounding vehicle. More specifically, determination whether a vehicle is a front vehicle is made based on the current position and the azimuthal angle included in the vehicle state notification information. It is noted, based on the information, such as the current position and the azimuthal angle included in the vehicle state notification information, determination may not be made with high accuracy whether a vehicle is travelling on the same lane as the self vehicle. Therefore, a front vehicle may include a vehicle, which travels in a different lane from a lane on which the self vehicle travels.

Figure 3:
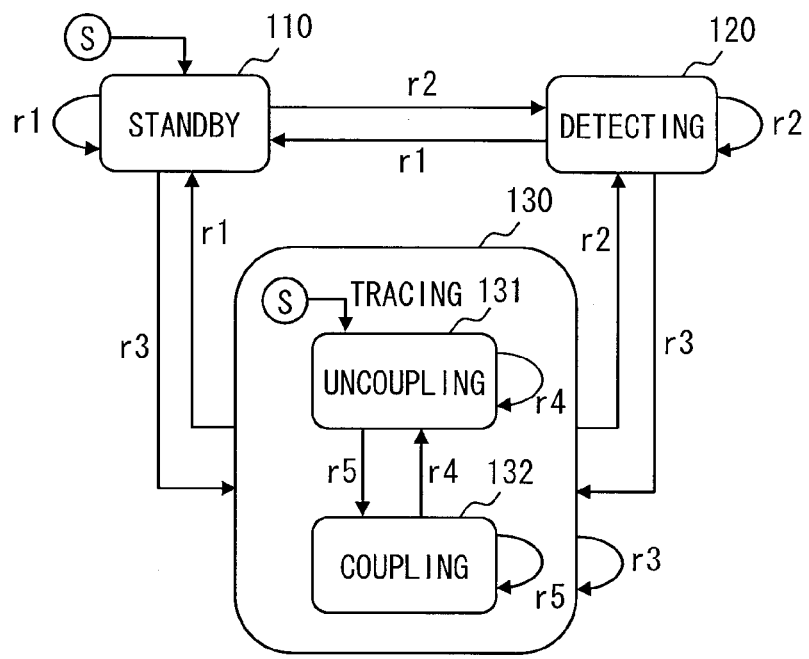
FIG. 3 is a explanatory diagram showing the front vehicle recognition state.

As shown in FIG. 3, the front vehicle recognition state is classified into a standby state 110, a detecting state 120, and a tracing state 130. The tracing state 130 includes an uncoupling state 131 and a coupling state 132 as subdivisions. In FIG. 3, "s" represents a state of initializing. That is, an initial state of the front vehicle recognition state is the standby state 110.

In the standby state 110, the vehicle state notification information is not received from a front vehicle. In the detecting state 120, the vehicle state notification information is acquired from at least one front vehicle, nevertheless, a leading vehicle is not specified. In the tracing state 130, a leading vehicle is specified, and the self vehicle travels immediately after the leading vehicle. In the state where the self vehicle travels immediately after the leading vehicle, another vehicle does not exist between the leading vehicle and the self vehicle, regardless of the distance between the leading vehicle and the self vehicle. In the uncoupling state 131, a leading vehicle is specified, and the self vehicle travels immediately after the leading vehicle, nevertheless, the self vehicle does not implement rank traveling relative to the leading vehicle. In the coupling state 132, a leading vehicle is specified, and the self vehicle implements rank traveling together with the leading vehicle.

In FIG. 3, the arrow r1 represents a state where a standby state condition is satisfied, and it is determined that the present state is to be in the standby state 110. The standby state condition includes a standby state condition 1 and a standby state condition 2. The standby state condition 1 is satisfied when the vehicle state notification information is not received from a surrounding vehicle for a predetermined time period. The standby state condition 2 is satisfied when the vehicle state notification information is received from at least one surrounding vehicle, nevertheless, it is subsequently determined, from contents of the vehicle state notification information, that none of the at least one surrounding vehicle is a front vehicle for a predetermined time period.

In the standby state 110, when the standby state condition 1 or 2 is satisfied, the standby state 110 is maintained. In the detecting state 120 or the tracing state 130, when the standby state condition 1 or 2 is satisfied, the detecting state 120 or the tracing state 130 moves into the standby state 110.

The arrow r2 represents a state where a detecting state condition is satisfied, and it is determined that the present state is to be in the detecting state 120. The detecting state condition is satisfied when the vehicle state notification information is received from a surrounding vehicle, and it is determined from contents of the vehicle state notification information that the surrounding vehicle is a front vehicle, nevertheless, a leading vehicle cannot be specified in a leading vehicle specifying processing. The leading vehicle specifying processing will be described later in detail. In the detecting state 120, when the detecting state condition is satisfied, the detecting state 120 is maintained. In the standby state 110 or the tracing state 130, when the detecting state condition is satisfied, the standby state 110 or the tracing state 130 moves into the detecting state 120.

The arrow r3 represents a state where a tracing state condition is satisfied, and it is determined that the present state is to be in the tracing state 130. The tracing state condition is satisfied when the vehicle state notification information is received from a surrounding vehicle, and it is determined from contents of the vehicle state notification information that a leading vehicle can be specified in the leading vehicle specifying processing. When a leading vehicle can be specified in the leading vehicle specifying processing, it is deemed that the self vehicle travels immediately after the leading vehicle. In the tracing state 130, when the tracing state condition is satisfied, the tracing state 130 is maintained. In the standby state 110 or the detecting state 120, when the tracing state condition is satisfied, the standby state 110 or the detecting state 120 moves into the tracing state 130.

The arrow r4 represents a state where an uncoupling state condition is satisfied, and it is determined that the present state is to be in the uncoupling state 131. Only in the tracing state, it may be determined whether the uncoupling state condition is satisfied. The uncoupling state condition includes an uncoupling state condition 1 and an uncoupling state condition 2. The uncoupling state condition 1 is satisfied when the coupling request is not sent to a leading vehicle. The uncoupling state condition 2 is satisfied when the coupling request is sent to a leading vehicle, nevertheless, the coupling permission is not acquired from the leading vehicle.

In the uncoupling state 131, when the uncoupling state condition is satisfied, the uncoupling state 131 is maintained. In the coupling state 132, when the uncoupling state condition is satisfied, the coupling state 132 moves into the uncoupling state 131. When a state other than the tracing state 130 moves into the tracing state 130, the state is set to the uncoupling state 131 as an initial state.

The arrow r5 represents a state where a coupling state condition is satisfied, and it is determined that the present state is to be in the coupling state 132. Only in the tracing state, it is determined whether the coupling state condition is satisfied. In the coupling state condition, the coupling request is sent to a leading vehicle, and the coupling permission is acquired from the leading vehicle.

Subsequently, the leading vehicle specifying processing will be described with reference to FIG. 5. At step S11, step S2 in FIG. 2 is periodically executed thereby to calculate a vehicle-to-vehicle-distance change rate dr (radar) based on the distance r (radar) between the vehicles, which is calculated and stored periodically.

At step S12, the difference between the GPS information (latitude and longitude), which is included in the vehicle state notification information of the surrounding vehicle acquired at step S3, and the current position (latitude and longitude) of the self vehicle acquired by the positioning operation at step S1 is calculated. The calculated difference is set as the distance r (GPS) between the self vehicle and the surrounding vehicle. In a case where the vehicle state notification information is acquired from multiple surrounding vehicles, the distance r (GPS) between the self vehicle and a surrounding vehicle is calculated for each of the multiple surrounding vehicles. It is determined, from the device ID included in the vehicle state notification information, whether multiple items of the vehicle state notification information are sent from an identical vehicle or different vehicles. The distance r (GPS) between the self vehicle and the surrounding vehicle calculated for each of surrounding vehicles is stored in the storage unit 20.

At step S13, the vehicle-to-vehicle-distance change rate dr (GPS) is periodically calculated for each of vehicles from the distance r (GPS), which is periodically calculated and stored by exECU ting step S12.

At step S14, a square of residual error $d^2$ for each of vehicles is calculated from the following formula 1. The square of residual error $d^2$ is a value comprehensively representing a degree of difference between the distance r (radar) and the distance r (GPS), a degree of difference between the vehicle-to-vehicle-distance change rate dr (radar) and the vehicle-to-vehicle-distance change rate dr (GPS), and a degree of a lateral offset LatOffset. The lateral offset LatOffset is a value representing a degree of the distance of a surrounding vehicle relative to the travelling direction of the self vehicle in the lateral direction. The lateral offset LatOffset is calculated from the GPS information and the azimuthal angle.

$$d^2 = (y-x)^T \sum\nolimits^{-1} (y-x)$$ [Formula 1]

$$\sum\nolimits^{-1} = \begin{pmatrix} S_{11} & S_{12} & S_{13} \\ S_{21} & S_{22} & S_{23} \\ S_{31} & S_{32} & S_{33} \end{pmatrix}$$

$$x = \begin{pmatrix} r_{RADAR} \\ dr_{RADAR} \\ 0 \end{pmatrix}$$

$$y = \begin{pmatrix} r_{GPS} \\ dr_{GPS} \\ LatOffset \end{pmatrix}$$

At step S15, it is determined whether the vehicle state notification information, of which the square of residual error $d^2$ calculated at step S14 is less than or equal to a threshold, exists. When the vehicle state notification information, of which the square of residual error $d^2$ is less than or equal to the threshold, does not exist, it is determined that a leading vehicle cannot be specified. Alternatively, when the vehicle state notification information, of which the square of residual error $d^2$ is less than or equal to the threshold, exists, the vehicle, which sends the vehicle state notification information, is set as a leading vehicle. It is noted that, the vehicle ID is not included in the vehicle state notification information. Therefore, a leading vehicle is identified, specifically, by setting the device ID, which is included in the vehicle state notification information, as the device ID of the vehicular communication device 1 of the leading vehicle. That is, the device ID is used as the leading vehicle specifying information. It is noted that, in the processing at step S15, a leading vehicle may be specified according to, in addition to the square of residual error $d^2$, determination whether the travelling direction of the surrounding vehicle is the same as the travelling direction of the self vehicle and/or determination whether the vehicle state notification information is acquired from the surrounding vehicle at a predetermined interval or less.

Figure 4:
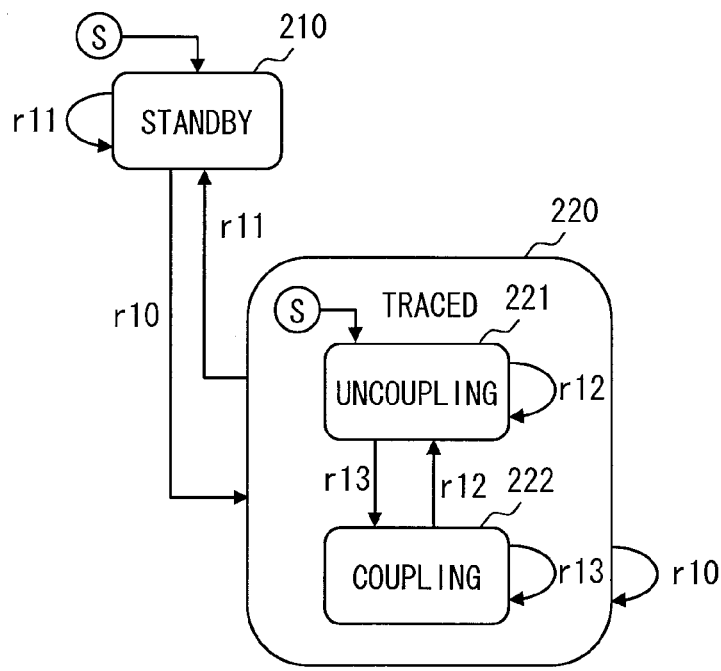
FIG. 4 is a explanatory diagram showing the rear vehicle recognition state.

Description will be continued with reference to FIG. 2 again. Step S5 may be one example of a rear vehicle recognition determination unit. At step S5, it is determined whether the present state is a rear vehicle recognition state in which the self vehicle recognizes a rear vehicle behind the self vehicle. As shown in FIG. 4, the rear vehicle recognition state is classified into a standby state 210 and a traced state 220. The traced state 220 includes an uncoupling state 221 and a coupling state 222 as subdivisions. In also FIG. 4, "s" represents a state of initializing.

In the traced state 220, the self vehicle recognizes that a rear vehicle travels in the tracing state in which the rear vehicle sets the self vehicle as a leading vehicle. The wording of the rear vehicle represents a vehicle, which travels immediately after the self vehicle on the same lane as the lane on which the self vehicle travels. When the rear vehicle recognition state is not the traced state 220, the rear vehicle recognition state is the standby state 210. In the uncoupling state 221, the present state is the traced state, nevertheless, the self vehicle does not implement rank traveling relative to the rear vehicle. In the coupling state 222, a rear vehicle is specified, and the self vehicle implements rank traveling together with the rear vehicle.

In FIG. 4, the arrow r10 represents a state where a traced state condition is satisfied, and it is determined that the present state is to be in the traced state 220. The traced state condition is satisfied when the vehicle state notification information is acquired from a rear vehicle, the front vehicle tracing state, which is included in the vehicle state notification information, is the tracing state, and it is determined that the vehicle being traced is the self vehicle. When the traced state condition is satisfied in the standby state 210, the standby state 210 moves into the traced state 220. When the traced state condition is satisfied in the traced state 220, the traced state 220 is maintained.

The arrow r11 represents a state where a standby state condition is satisfied, and it is determined that the present state is to be in the standby state 210. The standby state condition is satisfied when the condition (1), the condition (2), or the condition (3), as follows, is satisfied. The condition (1) is satisfied when the vehicle state notification information is not received from any of vehicles for a predetermined time period. The condition (2) is satisfied when the vehicle state notification information is received, nevertheless, the front vehicle recognition state, which is included in the vehicle state notification information, is not the tracing state, The condition (3) is satisfied when the vehicle state notification information is received, and the front vehicle recognition state, which is included in the vehicle state notification information, is the tracing state, nevertheless, the device ID, which specifies the currently traced front vehicle, is not own device ID. When the standby state condition is satisfied in the standby state 210, the standby state 210 is maintained. When the standby state condition is satisfied in the traced state 220, the traced state 220 moves into the standby state 210.

The arrow r12 represents a state where an uncoupling state condition is satisfied, and it is determined that the present state is to be in the uncoupling state 221. Only in the traced state, it is determined whether the uncoupling state condition is satisfied. The uncoupling state condition includes an uncoupling state condition 1 and an uncoupling state condition 2. The uncoupling state condition 1 is satisfied when the coupling request is not received from a rear vehicle. The uncoupling state condition 2 is satisfied when the coupling request is received from a rear vehicle, nevertheless, the coupling permission is not sent to the rear vehicle.

In the uncoupling state 221, when the uncoupling state condition is satisfied, the uncoupling state 221 is maintained. In the coupling state 222, when the uncoupling state condition is satisfied, the coupling state 222 moves into the uncoupling state 221. When the standby state 210 moves into the traced state 220, the state is set to the uncoupling state 221 as an initial state.

The arrow r13 represents a state where a coupling state condition is satisfied, and it is determined that the present state is to be in the coupling state 222. Only in the traced state, it is determined whether the coupling state condition is satisfied. The coupling state condition is satisfied when the coupling request is received from a rear vehicle, and the coupling permission is sent to the rear vehicle. When the coupling state condition is satisfied in the uncoupling state 221, the uncoupling state 221 moves into the coupling state 222. When the coupling state condition is satisfied in the coupling state 222, the coupling state 222 is maintained.

At step S6, the front vehicle recognition state and/or the rear vehicle recognition state determined at step S4 and/or step S5 are sent to other control devices, such as the rank-traveling ECU 70 and/or the collision determination ECU 80, which are equipped to the vehicle, through the CAN 50. The present processing enables, for example, the collision determination ECU 80, in a case where the front vehicle recognition state is the coupling state, to recognize that the rank traveling is implemented, and the distance between the self vehicle and the front vehicle is small. Furthermore, for example, the collision determination ECU 80 may be configured not to cause an alarm when the front vehicle recognition state is the coupling state. The present configuration enables to prohibit alarm in a case where the predetermined alarm reference time period is set to 0.6 sec, and the distance between vehicles when implementing rank-traveling is a distance, which the self vehicle can travel in 0.5 sec. That is, when the front vehicle recognition state is the coupling state, alarm is prohibited when the arrival time period (e.g., 0.5 sec), from the present position of the self vehicle to the present position of the front vehicle, is less than the predetermined alarm reference time period (e.g., 0.6 sec).

At step S6, notification about the rank traveling, which is included in the vehicle state notification information sent from a leading vehicle and/or a rear vehicle and acquired at step S3, is sent to the rank-traveling ECU 70. The notification about the rank traveling may include the coupling request and/or the uncoupling notification from a rear vehicle, which recognizes the self vehicle as a leading vehicle. The notification about the rank traveling may include the coupling permission and/or the coupling refusal from a leading vehicle, which recognizes the self vehicle as a rear vehicle.

The rank-traveling ECU 70 determines, as a response to the coupling request, one of the coupling permission and the coupling refusal, when the notification is the coupling request from a rear vehicle, which recognizes the self vehicle as a leading vehicle. When the front vehicle recognition state is the tracing state, it is determined whether to send the coupling request to require coupling with a leading vehicle or to send the uncoupling notification to notify uncoupling from the leading vehicle. When the coupling request is sent in the coupling state, the coupling state is maintained. When the uncoupling request is sent in the uncoupling state, the uncoupling state is maintained. At step S7, instruction about the rank traveling, such as the coupling permission, the coupling refusal, the coupling request, and/or the uncoupling notification, which is determined by the rank-traveling ECU 70, is acquired.

At step S8, the vehicle state notification information is generated. As described at step S3, the vehicle state notification information may include the device ID of the vehicular communication device 1, the current position, the speed of the vehicle (self vehicle), the azimuthal angle, the width of the vehicle (self vehicle), and/or the length of the vehicle (self vehicle). The vehicle state notification information may include the front vehicle recognition state and/or the rear vehicle recognition state. The vehicle state notification information may include the device ID of the vehicular communication device 1 equipped to a front vehicle, which is currently traced. The vehicle state notification information may include the device ID of the vehicular communication device 1 equipped to a rear vehicle, which currently traces the self vehicle. The vehicle state notification information may include an instruction about rank traveling, such as the coupling request, the uncoupling notification, the coupling permission, and/or the coupling refusal.

Subsequent step S9 may be one example of a sending control unit. At step S9, the vehicle state notification information generated at step S7 is sent from the inter-vehicle communication unit 10 to surroundings in a broadcast method. The vehicular communication device 1 equipped to a surrounding vehicle receives the vehicle state notification information sent at step S9 and implements the processing shown in FIG. 2 in response to reception of the vehicle state notification information. Thus, the vehicular communication device 1 equipped to a surrounding vehicle is enabled to determine the front vehicle recognition state and/or the rear vehicle recognition state of a surrounding vehicle according to the front vehicle recognition state and/or the rear vehicle recognition state of the vehicle, from which the vehicle state notification information is sent. In addition, various vehicular devices equipped to a surrounding vehicle is also enabled to implement a control operation according to the front vehicle recognition state and/or the rear vehicle recognition state of the self vehicle.

Figure 6A:
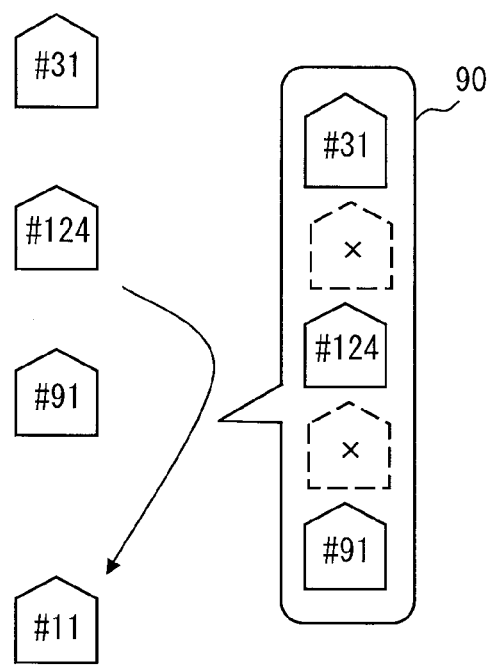
FIG. 6A is a diagram showing a recognition state of a surrounding vehicle produced by the vehicular communication device according to the embodiment of the present disclosure.
Figure 6B:
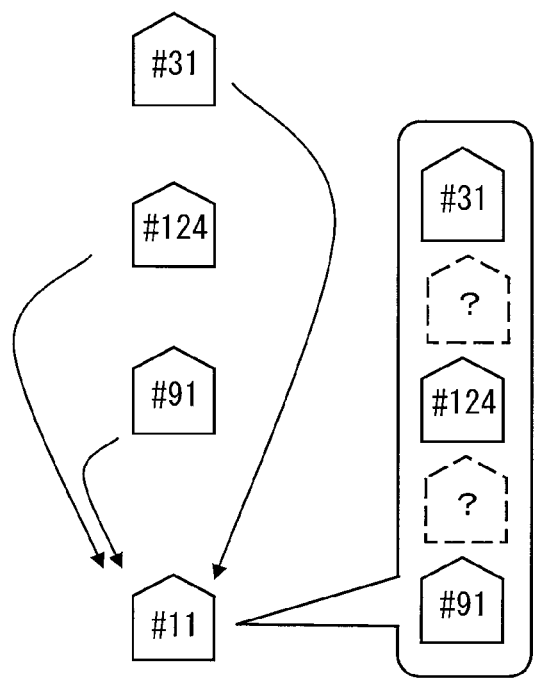
FIG. 6B is a diagram showing a state according to a prior art.

FIGS. 6A and 6B show a front vehicle, which is enabled to recognize the self vehicle (#11 in FIG. 6) according to the present embodiment, and a prior art. In FIGS. 6A and 6B, #n (n=11, 31, 91, 124) represents a device ID of the vehicular communication device 1 equipped to each vehicle.

FIG. 6A shows a configuration equipped with the vehicular communication device 1 of the present embodiment. FIG. 6B shows a configuration equipped with a communication device of the prior art. The communication device of FIG. 6B broadcasts only information about the self vehicle, which is equipped with the communication device.

In FIG. 6A, a notation 90 conceptually represents an example of the vehicle state notification information, which is sent in a broadcast method from the vehicular communication device 1 assigned with a device ID #124. The vehicle state notification information 90 represents that the front vehicle recognition state is the tracing state, and the vehicular communication device 1 of the leading vehicle is assigned with ID #31. The vehicle state notification information 90 further represents that the rear vehicle recognition state is the traced state, and the vehicular communication device 1 of the rear vehicle is assigned with ID #91. The vehicle state notification information 90 further represents that the self vehicle is assigned with ID #124. In the vehicle state notification information 90, the dotted line frame with the notation X conceptually represents that a vehicle does not exist.

The vehicular communication device 1 assigned with the ID #11 receives the vehicle state notification information 90, which represents that the front vehicle recognition state is the tracing state, and the rear vehicle recognition state is the traced state. Thus, the vehicular communication device 1 is enabled to recognize, as shown by the notations X in FIG. 6A, that a vehicle does not exist between the vehicle of #124 and the vehicle of #31, and a vehicle does not exist between the vehicle of #124 and the vehicle of #91.

To the contrary, in the configuration of FIG. 6B, only the position of a vehicle is acquired from each vehicle. In the configuration of FIG. 6B, as represented by the notations ?, it is impossible to recognize whether a vehicle exists between the vehicle of #31 and the vehicle of #124 and to recognize whether a vehicle exists between the vehicle of #124 and the vehicle of #91.

To the contrary, as described above, the configuration of the present embodiment enables to recognize that a vehicle does not exist between the vehicle of #124 and the vehicle of #31 and to recognize that a vehicle does not exist between the vehicle of #124 and the vehicle of #91. Therefore, the present embodiment enables further advanced traveling control compared with the prior art and is further advantageous to the prior art.

As described above, according to the present embodiment, the present configuration is configured to acquire (S3) the vehicle state notification information, which is sent from a surrounding vehicle existing around the self vehicle. The vehicle state notification information includes the GPS information about the surrounding vehicle. The present configuration is further configured to acquire (S2) the distance r (radar) between the self vehicle and a leading vehicle. The present configuration is further configured to determine (S4), from these two items of information, one of the three states including the standby state, the detecting state, and the tracing state, as the front vehicle recognition state of the self vehicle. The present configuration is further configured to determine (S5) the rear vehicle recognition state of the self vehicle. The present configuration is further configured to incorporate (S9) the front vehicle recognition state and the rear vehicle recognition state in the vehicle state notification information and to send the vehicle state notification information to surroundings of the self vehicle. Therefore, the present configuration enables a vehicle, which receives the vehicle state notification information, to recognize, in addition to the behavior of the vehicle, from which the vehicle state notification information is sent, existence of a vehicle ahead of the vehicle and/or existence of a vehicle behind the vehicle. Therefore, the vehicle, which receives the vehicle state notification information, is enabled to implement further advanced traveling control.

One embodiment of the present disclosure has been described. It is noted that, the present disclosure is not limited to the above-described embodiment. The following embodiments are, at least, also included in the technical scope of the present disclosure. In addition to the following embodiments, the present disclosure may be variously practiced, as long as the practice does not deviate from a gist of the present disclosure.

(Modification)

In the above-described embodiment, for example, a leading vehicle is specified from the square of residual error $d^2$ represented by the formula 1. It is noted that, the present disclosure is not limited to the above-described example. For example, a leading vehicle may be specified based on a comparison between a history of the distance r (radar) between the self vehicle and the leading vehicle, which is detected by the radar device 60, and a history of the distance r (GPS) between the self vehicle and the leading vehicle, which is detected from the GPS information. For example, a leading vehicle may be specified based on a comparison between a history of a speed, which is acquired by differentiating the distance r (radar), and a history of a speed, which is acquired by differentiating the distance r (GPS). In this case, the speed serves as the behavior related information. For example, a leading vehicle may be specified from both the history of the distance between the self vehicle and the leading vehicle and the history of the speed. For example, a leading vehicle may be specified from an acceleration instead of or in addition to the distance between the self vehicle and the leading vehicle and/or the speed.

According to the present embodiment, a surrounding vehicle recognition device, which is equipped to a vehicle, is configured to implement sequential determination of a front vehicle recognition state, which is a recognition state of a self vehicle about a front vehicle traveling in front of the self vehicle. The surrounding vehicle recognition device includes an inter-vehicle communication device (10). The surrounding vehicle recognition device further includes a surrounding vehicle information acquisition unit (30, S3) configured to acquire, via the vehicle-to-vehicle-communications equipment, vehicle state notification information, which is sent from a surrounding vehicle existing around the vehicle, the vehicle state notification information including behavior related information, which is at least one of a position of the surrounding vehicle and speed related information. The surrounding vehicle recognition device further includes a behavior acquisition unit (30, S2) configured to acquire the behavior related information about a leading vehicle, which travels at a position closest to the self vehicle on an advancing route of the self vehicle. The surrounding vehicle recognition device further includes a front vehicle recognition determination unit (30, S4) configured to determine, as the front vehicle recognition state, one of three states including: a standby state, in which the vehicle state notification information is not received from a front vehicle, a detecting state, in which the vehicle state notification information is received from at least one front vehicle, and the leading vehicle cannot be specified, and a tracing state, in which the leading vehicle is specified, and the vehicle travels immediately after the leading vehicle, according to the behavior related information included in the vehicle state notification information, which is acquired by the surrounding vehicle information acquisition unit; and the behavior related information, which is acquired by the behavior acquisition unit. The surrounding vehicle recognition device further includes a sending control unit (30, S9) configured to incorporate the front vehicle recognition state, which is determined by the front vehicle recognition determination unit, self vehicle specifying information, which specifies the self vehicle, and the behavior related information on the self vehicle, into the vehicle state notification information. The sending control unit (30, S9) is further configured to incorporate leading vehicle specifying information, which specifies the leading vehicle, into the vehicle state notification information, when the tracing state is determined as the front vehicle recognition state, and to cause the inter-vehicle communication device to send the vehicle state notification information to surroundings of the self vehicle.

The present configuration acquires the vehicle state notification information, which incorporates the behavior related information sent from the surrounding vehicle existing around the self vehicle. The present configuration further acquires the behavior related information about the leading vehicle, which travel at the closest position relative to the self vehicle on the advancing route of the self vehicle. The present configuration determines, from these two items of the behavior related information, one of the three states including the standby state, the detecting state, and the tracing state, as the front vehicle recognition state of the self vehicle. The present configuration is further configured to incorporate the front vehicle recognition state in the vehicle state notification information and to send the vehicle state notification information to surroundings of the self vehicle. Therefore, the present configuration enables a vehicle, which receives the vehicle state notification information, to recognize, in addition to the behavior of the vehicle, from which the vehicle state notification information is sent, existence of a vehicle ahead of the vehicle. Therefore, the vehicle, which receives the vehicle state notification information, is enabled to implement further advanced traveling control.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A surrounding vehicle recognition device equipped to a vehicle and configured to implement sequential determination of a front vehicle recognition state, which is a recognition state of a self vehicle about a front vehicle traveling ahead the self vehicle, the surrounding vehicle recognition device comprising:
    an inter-vehicle communication device;
    a surrounding vehicle information acquisition unit configured to acquire, via the inter-vehicle communication device, vehicle state notification information, which is sent from a surrounding vehicle existing around the vehicle, the vehicle state notification information including behavior related information, which is at least one of a position of a surrounding vehicle and speed related information;
    a behavior acquisition unit configured to acquire the behavior related information about a leading vehicle, which travels at a position closest to the self vehicle on an advancing route of the self vehicle;
    a front vehicle recognition determination unit configured to determine, as the front vehicle recognition state, one of three states including:
        a standby state, in which the vehicle state notification information is not received from a front vehicle;
        a detecting state, in which the vehicle state notification information is received from at least one front vehicle, and a leading vehicle cannot be specified; and
        a tracing state, in which a leading vehicle is specified, and the self vehicle travels immediately after the leading vehicle, wherein the front vehicle recognition state is determined according to the behavior related information included in the vehicle state notification information, which is acquired by the surrounding vehicle information acquisition unit, and the behavior related information, which is acquired by the behavior acquisition unit; and
    a sending control unit configured:
        to incorporate the front vehicle recognition state, which is determined by the front vehicle recognition determination unit, self vehicle specifying information, which specifies the self vehicle, and the behavior related information about the self vehicle, into the vehicle state notification information;
        to further incorporate leading vehicle specifying information, which specifies a leading vehicle, into the vehicle state notification information, when the tracing state is determined as the front vehicle recognition state; and
        to cause the inter-vehicle communication device to send the vehicle state notification information to surroundings of the self vehicle.

2. The surrounding vehicle recognition device according to claim 1, further comprising:
    a rear vehicle recognition determination unit configured to implement sequential determination of a rear vehicle recognition state, which is a recognition state of the self vehicle about a rear vehicle, which travels behind the self vehicle, wherein
    the rear vehicle recognition determination unit is further configured to determine that the traced state as the rear vehicle recognition state:
        when the front vehicle recognition state, which is included in the vehicle state notification information acquired by the surrounding vehicle information acquisition unit, is the tracing state; and
        when determining that the self vehicle is specified by the leading vehicle specifying information included in the vehicle state notification information,
    the rear vehicle recognition determination unit is further configured to determine that the rear vehicle recognition state as the standby state when the front vehicle recognition state, which is included in the vehicle state notification information acquired by the surrounding vehicle information acquisition unit, is not the tracing state,
    the rear vehicle recognition determination unit is further configured to determine that the rear vehicle recognition state as the standby state:
        when the front vehicle recognition state is the tracing state; and
        when determining that a vehicle, which is specified by the leading vehicle specifying information included in the vehicle state notification information, is not the self vehicle, and
    the rear vehicle recognition determination unit is further configured to determine that the rear vehicle recognition state as the standby state when the surrounding vehicle information acquisition unit does not acquire the vehicle state notification information.

3. The surrounding vehicle recognition device according to claim 2, wherein
    the sending control unit is further configured to incorporate the rear vehicle recognition state, which is specified by the rear vehicle recognition determination unit, and the rear vehicle specifying information, which specifies the rear vehicle, into the vehicle state notification information, and
    the sending control unit is further configured to cause the inter-vehicle communication device to send the vehicle state notification information to surroundings of the self vehicle.

4. The surrounding vehicle recognition device according to claim 2, wherein
    the traced state includes:
        an uncoupling state, in which the rear vehicle is specified, and rank traveling is not implemented relative to the rear vehicle; and
        a coupling state, in which the rear vehicle is specified, and rank traveling is implemented relative to the rear vehicle, and
    the rear vehicle recognition determination unit is further configured, when determining that the rear vehicle recognition state is the traced state, to determine whether it is in the uncoupling state or the coupling state.

5. The surrounding vehicle recognition device according to claim 4, wherein
    the rear vehicle recognition determination unit is further configured to determine that it is in the coupling state:
        when the coupling request is received from the rear vehicle; and
        when the coupling permission is sent from the inter-vehicle communication device, in response to the coupling request, and the rear vehicle recognition determination unit is further configured to determine that it is in the uncoupling state, when the coupling request is not received from a rear vehicle in the traced state, and the rear vehicle recognition determination unit is further configured to determine that it is in the uncoupling state:
when the coupling request is received; and
when the coupling permission is not sent.

6. The surrounding vehicle recognition device according to claim 1, wherein the tracing state includes:
an uncoupling state, in which a leading vehicle is specified, the self vehicle travels immediately after the leading vehicle, and rank traveling is not implemented relative to the leading vehicle; and
a coupling state, in which a leading vehicle is specified, and rank traveling is implemented relative to the leading vehicle, and the front vehicle recognition determination unit is further configured, when determining that the front vehicle recognition state is the tracing state, to determine whether it is in the uncoupling state or the coupling state.

7. The surrounding vehicle recognition device according to claim 6, wherein the front vehicle recognition determination unit has a condition to determine that it is in the tracing state:
when the surrounding vehicle information acquisition unit acquires the vehicle state notification information, which is sent from a front vehicle; and
when specifying, from the behavior related information about a leading vehicle, which is acquired by the behavior acquisition unit, that the vehicle state notification information is sent from the leading vehicle, the front vehicle recognition determination unit is further configured to determine that it is in the coupling state:
when the condition to determine that it is in the tracing state is satisfied;
when the coupling request is sent from the inter-vehicle communication device to a leading vehicle; and
when the coupling permission is received from the leading vehicle, and the front vehicle recognition determination unit is further configured to determine that it is in the uncoupling state:
when the condition to determine that it is in the tracing state is satisfied;
when the coupling request is sent to the leading vehicle; and
when the coupling permission is not received from the leading vehicle, and the front vehicle recognition determination unit is further configured to determine that it is in the uncoupling state:
when the condition to determine that it is in the tracing state is satisfied; and
when the coupling request is not sent from the inter-vehicle communication device to a leading vehicle.

8. The surrounding vehicle recognition device according to claim 1, wherein the front vehicle recognition determination unit is further configured to determine that it is in the standby state when the surrounding vehicle information acquisition unit does not acquire the vehicle state notification information, which is sent from a front vehicle, the front vehicle recognition determination unit is further configured to determine that it is in the detecting state:
when the surrounding vehicle information acquisition unit acquires the vehicle state notification information, which is sent from a front vehicle; and
when determining, from the behavior related information about a leading vehicle, which is acquired by the behavior acquisition unit, that the vehicle state notification information is not sent from the leading vehicle, and the front vehicle recognition determination unit is further configured to determine that it is in the tracing state:
when the surrounding vehicle information acquisition unit acquires the vehicle state notification information, which is sent from a front vehicle; and
when determining, from the behavior related information about a leading vehicle, which is acquired by the behavior acquisition unit, that the vehicle state notification information is sent from the leading vehicle.

* * * * *